(12) United States Patent
Hung et al.

(10) Patent No.: US 12,306,511 B2
(45) Date of Patent: May 20, 2025

(54) OPTICAL SIGNAL TRANSMITTER INCLUDING FOLDED COUPLING CONFIGURATION OF LASER SOURCE TO MICROWAVE PHOTONIC INTEGRATED CIRCUIT

(71) Applicant: OPTILAB, LLC, Phoenix, AZ (US)

(72) Inventors: Henry Hung, Paradise Valley, AZ (US); Leijun Yin, Tempe, AZ (US); Ke Huang, Phoenix, AZ (US); Xiaoyan Ying, Tempe, AZ (US)

(73) Assignee: Optilab, Inc., Phoenix, AZ (US)

( * ) Notice: Subject to any disclaimer, the term of this patent is extended or adjusted under 35 U.S.C. 154(b) by 240 days.

(21) Appl. No.: 17/826,023

(22) Filed: May 26, 2022

(65) Prior Publication Data

US 2022/0404679 A1 Dec. 22, 2022

Related U.S. Application Data

(60) Provisional application No. 63/212,432, filed on Jun. 18, 2021.

(51) Int. Cl.
*G02F 1/225* (2006.01)
*G02F 1/21* (2006.01)

(52) U.S. Cl.
CPC ........... *G02F 1/212* (2021.01); *G02F 1/2255* (2013.01); *G02F 2202/20* (2013.01)

(58) Field of Classification Search
CPC .... G02F 2202/20; G02F 1/2255; G02F 1/225; G02F 1/0356; G02F 1/025
See application file for complete search history.

(56) References Cited

U.S. PATENT DOCUMENTS

| | | | |
|---|---|---|---|
| 10,901,245 B2* | 1/2021 | Nikolov | G02F 1/0356 |
| 11,815,747 B1* | 11/2023 | Rabiei | G02F 1/225 |
| 2007/0268553 A1* | 11/2007 | Schneider | G02B 6/3588 |
| | | | 359/290 |
| 2020/0174337 A1* | 6/2020 | Iwatsuka | G02F 1/225 |

OTHER PUBLICATIONS

Zhao et al. "1550 nm DFB semiconductor lasers with high power and low noise," Proc. SPIE 7933, 79332J (2011).
Wang et al. "Integrated lithium niobate electro-optic modulators operating at CMOS-compatible voltages," Nature vol. 562, (2018), pp. 101-104.

(Continued)

*Primary Examiner* — Eric Wong
(74) *Attorney, Agent, or Firm* — George Fountain; LOZA & LOZA, LLP

(57) ABSTRACT

A compact optical device, such as an optical transmitter or transceiver, including a folded configuration, where an optical signal generated by a laser source propagates in a first direction, then is redirected in an orthogonal direction, and then redirected again to propagate in a second direction opposite the first direction. In accordance with the folded configuration, the optical signal from the laser source is coupled to a Mach-Zehnder interferometer (MZI) modulator that includes a thin-film lithium niobate (TFLN) waveguide coupled to a radio frequency (RF) transmission line to produce an RF signal modulated optical signal for remote transmission.

17 Claims, 6 Drawing Sheets

(56) References Cited

OTHER PUBLICATIONS

Beling et al. "High-power, high-linearity photodiodes," Optica 3, (2016), pp. 328-338.
Burla et al. "500 GHz plasmonic Mach-Zehnder modulator enabling sub-THz microwave photonics," APL Photonics 4, 056106, (2019), pp. 1-15.
Nisar et al. "Grating coupler for an on-chip lithium niobate ridge waveguide," IEEE Photonics J. 9(1), (2017), pp. 1-8.
Kang et al. "High-efficiency chirped grating couplers on lithium niobate on insulator," Opt. Express 45(24), 6651-6654 (2020).
Ying et al. "Low-loss edge-coupling thin-film lithium niobate modulator with an efficient phase shifter," Opt. Lett. 46(6) 1478-1481 (2021).
Hue et al. High-efficient coupler for thin-film lithium niobate waveguide devices, Opt. Express. 29(4), 5397-5406 (2021).

\* cited by examiner

OPTICAL SIGNAL TRANSMITTER INCLUDING FOLDED COUPLING CONFIGURATION OF LASER SOURCE TO MICROWAVE PHOTONIC INTEGRATED CIRCUIT

CROSS-REFERENCE TO RELATED APPLICATION

This application claims the benefit of the filing date of U.S. Provisional application, Ser. No. 63/212,432, filed on Jun. 18, 2021, which is incorporated herein by reference.

BACKGROUND

Field

Aspects of the present disclosure relate generally optical signal transmitters or transceivers, and in particular, to an optical signal transmitter or transceiver including a folded coupling configuration of a laser source (and associated optical components) to a Mach-Zehnder interferometer (MZI) modulator of a microwave photonic integrated circuit (MWPIC).

Background

To reduce radio frequency (RF) signal transmission loss between a transmitter and a receiver, an optical modulator may be employed to modulate an optical signal with an RF signal for transmission via an optical fiber from the transmitter to the receiver. Generally, the transmission over optical fiber is less lossy as compared to an electrical conductor-based transmission medium (e.g., coaxial cable, microwave waveguide, etc.). Additional benefits include wider bandwidths, higher transmission rates, less electromagnetic (EM) interference to other components due to the transmission of the signal being in the optical domain, less electromagnetic interference to the RF modulated optical signal from other EM emitting components, and an optical fiber that is generally lighter in weight, and easier to handle and route.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

An aspect of the disclosure relates to an apparatus, including: a Mach-Zehnder interferometer (MZI) modulator, including: a Y-optical splitter; a first thin-film lithium niobate (TFLN) waveguide formed within a TFLN material layer, wherein the first TFLN waveguide has a first index of refraction greater than a second index of refraction of the TFLN material layer, and wherein the first TFLN waveguide is coupled to a first output of the Y-optical splitter; a second TFLN waveguide formed within the TFLN material layer, wherein the second TFLN waveguide has the first index of refraction, and wherein the second TFLN waveguide is coupled to a second output of the Y-optical splitter; and a Y-optical combiner including a first input coupled to the first TFLN waveguide and a second input coupled to the second TFLN waveguide.

Another aspect of the disclosure relates to an apparatus, including a microwave photonic integrated circuit (MWPIC) comprising: a Mach-Zehnder interferometer (MZI) modulator; a substrate including an integrated lens; and a 45-degree inclined reflective surface, wherein the integrated lens is configured to focus an optical signal upon the 45-degree inclined reflective surface, and wherein the 45-degree inclined reflective surface is configured to redirect the optical signal towards the MZI modulator.

To the accomplishment of the foregoing and related ends, the one or more embodiments include the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the description embodiments are intended to include all such aspects and their equivalents.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Microwave Photonic Integrated Circuit (MWPIC) holds a great promise for realizing high performance and compact solutions for various applications, including telecommunication infrastructures, data centers, sensing applications, analog signal distribution and communication, signal routing and time delay beamforming in phased array antennas, and radio frequency (RF) signal up/down conversion. Various materials, such as silicon (Si), indium-phosphide (InP), silicon carbide (SiC) and gallium arsenide (GaAs), have been used in MWPIC platforms. However, for various reasons, these materials have generally fallen short in providing a unified platform to achieve merits preferred for various performance indexes (e.g., low propagation loss, fast optical modulation, efficient all-optical nonlinearities, etc.).

On the other hand, lithium niobate (LiNbO3 or "LN", for short) based MWPIC platforms, such as used in electro-optic modulators, are generally preferred for electrical-to-optical (E2O) conversion, owing to its exceptional linearity and stability. Despite its desirable material property, lithium niobate (LN) has generally fallen behind competing integrated photonic platforms, mainly due to difficulties of material integration and processing. For example, lithium niobate (LN) based photonic components have generally remained bulky since its inception in the 1960s.

It was not until the last decade, primarily due to the development in fabrication and wafer bonding techniques, that thin-film lithium niobate (TFLN) platforms achieving wide variety of performances have been developed, providing promising solutions for integration of different types of modulators, couplers, wavelength converters, transducers, and others. However, due to mismatch of development between TFLN platforms and other major photonic components, integration of the disparate optical components onto an interconnected platform remains challenging for the industry.

As discussed in more detail further herein, disclosed is an industrial applicable TFLN based platform for integration between photonic components based on photonic device designs and manufacturing abilities. The TFLN based platform is low loss, low cost, and an easily accessible solution, which may pave the way for many additional developments in the field of TFLN MWPIC.

Figure 1A:
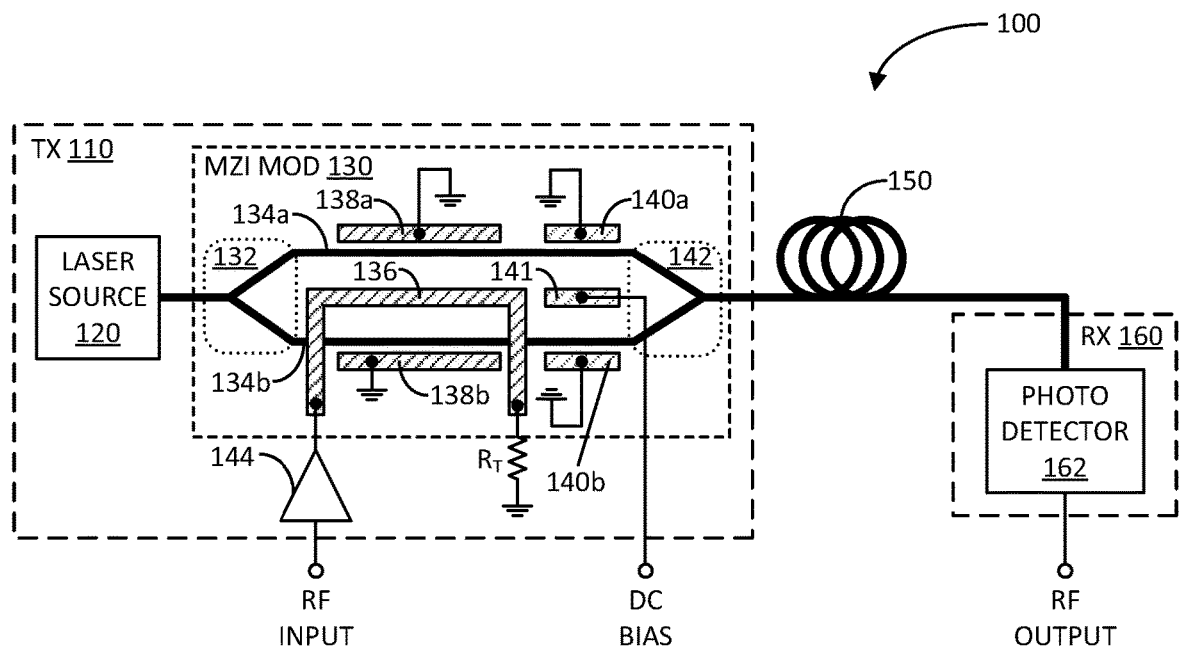
FIG. 1A illustrates a block diagram of an exemplary optical signal transmission system in accordance with an aspect of the disclosure.

FIG. 1A illustrates a block diagram of an exemplary optical signal transmission system 100 in accordance with an aspect of the disclosure. The optical signal transmission system 100 is an analog microwave photonics link (AMPL), which is an RF transmission system utilizing optical/electrical conversion to transmit an RF signal in optical wave form. As discussed further herein, due to its high linearity characteristic, an optical signal modulator as part of the optical signal transmission system 100 may be implemented as a Mach-Zehnder interferometer (MZI) modulator for electrical-to-optical signal conversion.

More specifically, the optical signal transmission system 100 includes an optical signal transmitter 110, an optical signal receiver 160, and a transmission optical fiber 150 (e.g., a single-mode fiber) optically coupling the optical signal transmitter 110 to the optical signal receiver 160.

The optical signal transmitter 110, in turn, includes a light or laser source 120, an optical signal modulator 130 (e.g., a Mach-Zehnder interferometer (MZI) modulator), a radio frequency (RF) low noise amplifier (LNA) 144, and a termination resistor $R_T$ (e.g., 50 Ohms). The laser source 120 may be a continuous wave (CW), distributed feedback (DFB) laser, for example, configured to generate a CW optical signal with a wavelength of substantially 1550 nanometers (nm) (e.g., within a specified tolerance for the laser source 120), or other wavelength or wavelength range.

The MZI modulator 130, in turn, includes a Y-optical splitter 132, a first optical waveguide 134a, a second optical waveguide 134b, and a Y-optical combiner 142. The Y-optical splitter 132, the first optical waveguide 134a, the second optical waveguide 134b, and the Y-optical combiner 142 may be implemented using TFLN or other suitable material for electrical-to-optical modulation (e.g., InP, SiC, GaAs, etc.). The laser source 120 is coupled to an input of the Y-optical splitter 132. The first optical waveguide 134a is coupled between a first output of the Y-optical splitter 132 and a first input of the Y-optical combiner 142, and the second optical waveguide 134b is coupled between a second output of the Y-optical splitter 132 and a second input of the Y-optical combiner 142. The Y-optical combiner 142 includes an output coupled to the transmission optical fiber 150.

The MZI modulator 130 further includes a coplanar transmission line including an RF signal transmission line 136 including a first end coupled to an output of the LNA 144, and a second end coupled to the termination resistor $R_T$ to reduce or prevent RF signal reflections. The coplanar transmission line further includes a pair of grounded transmission lines 138a and 138b on either side of the RF signal transmission line 136. For improving RF-to-optical coupling, the RF signal transmission line 136 is positioned laterally between the first and second optical waveguides 134a-b; the first optical waveguide 134a is positioned laterally between the RF signal transmission line 136 and the grounded transmission line 138a; and the second optical waveguide 134b is positioned laterally between the RF signal transmission line 136 and the grounded transmission line 138b.

Further, the MZI modulator 130 further includes grounded electrical conductors 140a and 140b positioned on either side of a DC biased electrical conductor 141. proximate the first and second optical waveguides 134a and 134b, respectively. The DC biased electrical conductor 141 is positioned laterally between the first and second optical waveguides 134a-b; the first optical waveguide 134a is positioned laterally between the DC biased electrical conductor 141 and the grounded electrical conductor 140a; and the second optical waveguide 134b is positioned laterally between the DC biased electrical conductor 141 and the grounded electrical conductor 140b. The electrical conductor 141 may be configured to receive a direct current (DC) bias voltage to set the quadrature bias point for the MZI modulator 130.

In operation, the Y-optical splitter 132 is configured to receive the CW optical signal generated by the laser source 120, and split the CW optical signal into two optical signals for transmission via the first and second optical waveguides 134a-b, respectively. Simultaneously, the LNA 144 is configured to receive and amplify an input RF signal, and provide the amplified RF signal to the coplanar transmission. The RF signal amplification helps to increase the overall link gain and lower the link noise figure (NF).

Due to the proximity and relative position of the coplanar transmission line with respect to the first and second optical waveguides 134a-b, the TFLN material of the waveguides 134a-b reacts to the electromagnetic (EM) field produced by the amplified RF signal. The reaction to the EM field results in differentially modulating the phases of the optical signals propagating through the first and second optical waveguides 134a-b, respectively. The phase modulated optical signals are combined by the Y-optical combiner 142 to generate an output optical signal amplitude/phase modulated by the amplified RF signal.

The output RF modulated optical signal is then sent to the optical signal receiver 160 via the transmission optical fiber 150. The optical signal receiver 160 includes a photo detector (PD) 162 to perform optical-to-electrical conversion; or more specifically, to convert (e.g., demodulate) the received RF modulated optical signal into an output RF signal. It shall be understood that the optical signal receiver 160 may include additional components, such as an optical amplifier, a filter, an RF amplifier, and/or other component(s).

As an example, with regard to the optical signal transmitter 110, the LNA 144 may have a gain of 25 decibels (dB) or more, and a noise figure (NF) of 3 dB or less. In addition to the relatively high gain/low NF LNA 144, the light or laser source 120 may be implemented to have a relatively high laser power (e.g., 40 milliWatts (mW) to 200 mW), and a low relative intensity noise (RIN) (e.g., −165 decibels relative to the carrier per Hertz (dBc/Hz)), which helps the link to achieve relatively low NF. The TFLN based MZI modulator 130 may achieve a low voltage complementary metal oxide semiconductor (LVCMOS) compatible driver voltage with a Vpi of 3.3 Volts (V) or less, while maintaining a relatively high bandwidth (e.g., 20 gigaHertz (GHz)) and a relatively low insertion loss (e.g., 3.5 dB or less).

With regard to optical transmission, the transmission optical fiber 150 may have an insertion loss of 0.5 dB or less (e.g., 0.15 dB per connector and 0.2 dB for an optical fiber having a length of one (1) kilometer (km)). With regard to the optical signal receiver 160, the photo detector (PD) 162 may have a responsivity of 0.8 ampere per watt (A/W) and may be able to handle relatively high power over a relatively large bandwidth (e.g., 20 GHz). Based on the aforementioned example specification, the optical signal transmission system 100 may achieve a link gain of 8.6 dB with a noise figure (NF) of 5.5 dB over a bandwidth of 20 GHz.

In optical signal transmission system 100, the mode field diameter (MFD) of the optical signal generated by the laser source 120 may be much larger than the MFD of the optical signal propagating through the TFLN waveguide of the MZI modulator 130. For example, the laser source 120 may generate an optical signal with an MFD of 3.7 micrometers (μm), while the TFLN waveguide of the MZI modulator 130 accommodates an optical signal with an MFD of 1 μm or less. Due to the mismatch in the MFDs, a relatively large coupling loss into the MZI modulator 130 occurs, which could become a hurdle in achieving the link performance mentioned above.

Figure 1B:
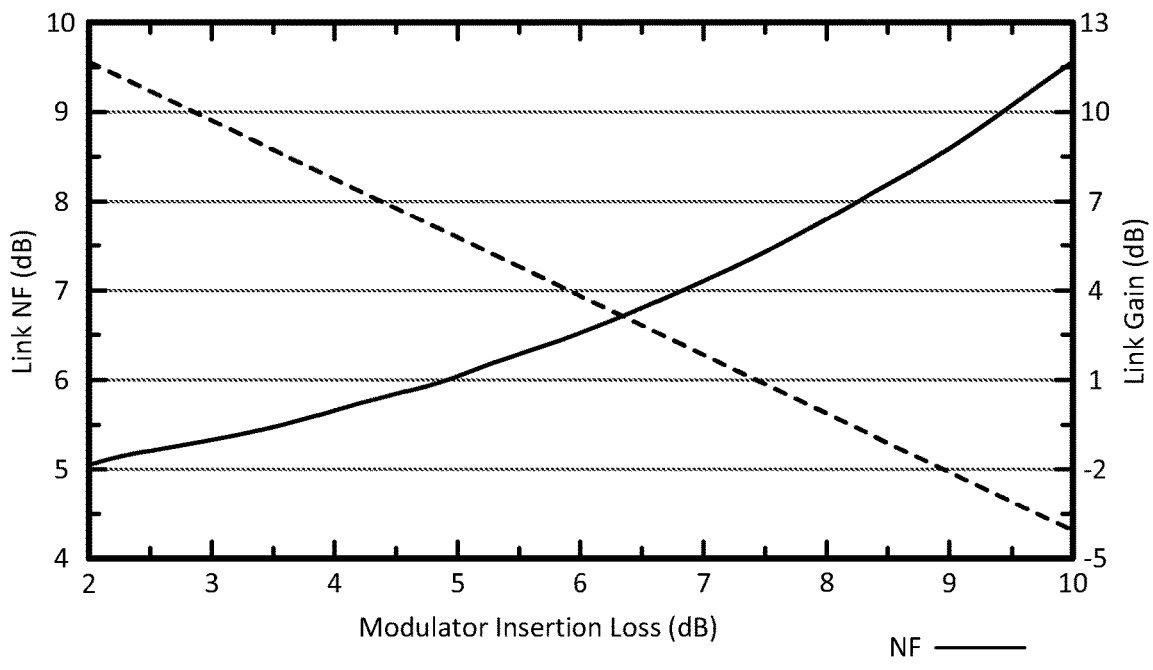
FIG. 1B illustrates a graph of exemplary responses of link noise figure (NF) and link gain with respect to insertion loss of an optical signal modulator of the optical signal transmission system of FIG. 1A in accordance with another aspect of the disclosure.

FIG. 1B illustrates a graph of exemplary responses of link noise figure (NF) and link gain with respect to the insertion loss (IL) of the MZI modulator 130 in accordance with another aspect of the disclosure. The x- or horizontal-axis represents the modulator insertion loss (IL) in dB, ranging from 2 dB to 10 dB. A first (left) y- or vertical axis represents the link noise figure (NF) in dB, ranging from 4 dB to 10 dB, and a second (right) y- or vertical axis represents link gain in dB, ranging from −5 dB to 13 dB. As indicated in the accompanying legend in FIG. 1B, the NF versus modulator IL response is represented as a solid curve, and the link gain versus modulator IL response is represented as a dashed line.

As the NF versus modulator IL response indicates, to keep the NF below 7 dB, the modulator IL should be less than 6.8 dB. If the modulator IL is 3.5 dB, for example, then the additional optical coupling loss into and out of the MZI modulator 130 should be less than 1.65 dB. Accordingly, the following describes an optical signal transmitter that is able to achieve such low loss optical coupling.

Figure 2:
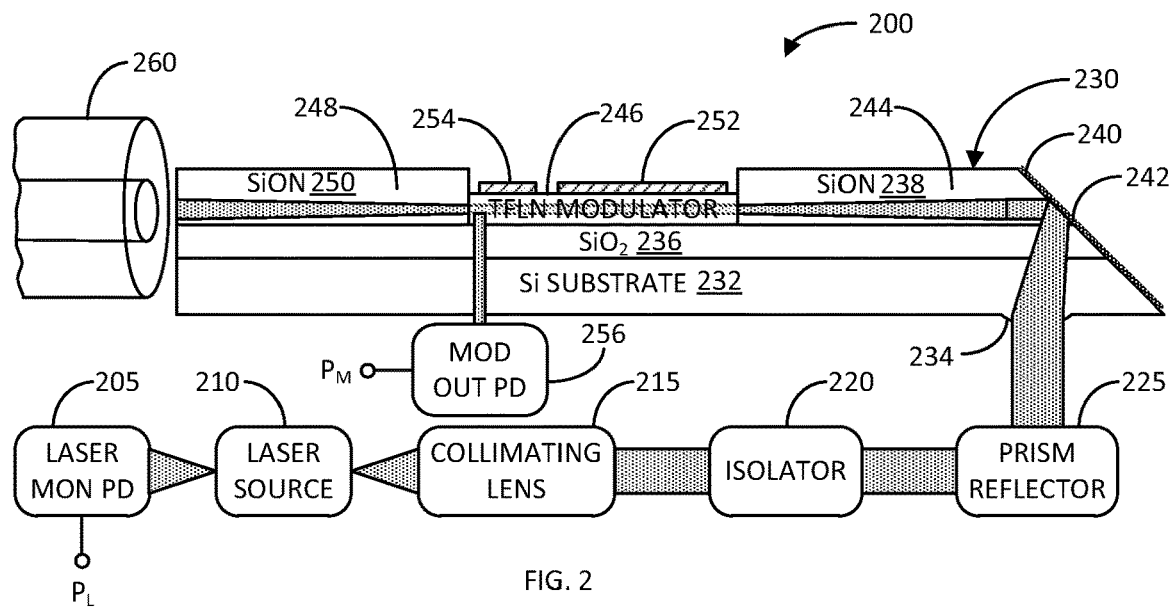
FIG. 2 illustrates a block diagram of an exemplary optical signal transmitter in accordance with another aspect of the disclosure.

FIG. 2 illustrates a block diagram of another exemplary optical signal transmitter 200 in accordance with another aspect of the disclosure. The optical signal transmitter 200 includes a light or laser source 210 (e.g., a continuous wave (CW) distributed feedback (DFB) laser), a laser monitoring photo detector (PD) 205, a collimating lens 215, an optical isolator 220, a prism reflector 225, and a microwave photonic integrated circuit (MWPIC) 230. For ease of explanation, all optical signals are depicted as shaded regions.

The laser source 210 is configured to generate a CW optical signal in "forward" and "reverse" directions. The wavelength of the CW optical signal may be 1550 nm (but could be another wavelength), which is able to propagate through silicon (Si) without significant loss. As discussed further herein, the MWPIC 230 may be implemented on a Si substrate, allowing the Si substrate to direct the optical signal to various optical components integrated therein. The reverse CW optical signal is provided to the laser monitoring PD 205 for monitoring the operation of the laser source 210. The laser monitoring PD 205 is configured to generate a laser power electrical signal $P_L$ related to the emitted power of the CW optical signal. For example, if the laser power signal $P_L$ is zero (0) or below an expected level, there may be an issue with the laser source 210. On the other hand, if the laser power signal $P_L$ is at expected power levels, the laser source 210 may be operating normally.

The forward CW optical signal from the laser source 210 is provided to the collimating lens 215. As illustrated, the CW optical signal emanating from the laser source 210 spatially diverges. Accordingly, the collimating lens 215 is configured to collimate the diverging optical signal to generate a collimated optical signal. The optical isolator 220 is configured to pass the collimated optical signal, while preventing reflected light or optical signal from propagating back towards the collimating lens 215 and to the laser source 210.

As discussed in more detail further herein, the optical signal transmitter 200 has a foldback optical configuration for product compactness purpose. That is, as depicted, the optical signal emanating from the laser source 210 propagates in a rightward horizontal direction, then propagates in an upward direction, and then propagates in a leftward direction. The right-upward-left directions entail a foldback optical signal propagation; ergo, the foldback optical configuration. Accordingly, to effectuate the right-to-upward optical signal direction change, the prism reflector 225 receives the rightward horizontal propagating light from the optical isolator 220, and redirects the propagating light upwards (e.g., performs a 90-degree optical signal direction change). As discussed further herein, the prism reflector 225 may also serve to align the optical signal such that it propagates as it should through the optical signal transmitter 200.

The MWPIC 230 may include a substrate 232 (e.g., a silicon (Si) substrate), an optional silicon oxide (SiO$_2$) layer 236 disposed over the Si substrate 232, a first silicon oxynitride (SiON) layer 238, disposed over the SiO$_2$ layer 236, and serving as an encapsulating layer for an input mode converter 244. The MWPIC 230 further includes a thin-film lithium niobate (TFLN) MZI modulator 246, and a second silicon oxynitride (SiON) layer 248, also disposed over the SiO$_2$ layer 236, and serving as an encapsulating layer for an output mode converter 248.

A lens 234 is formed or etched into the bottom of the Si substrate 232. From the perspective depicted, the MWPIC 230 includes a right side (formed by the SiON, SiO$_2$ and Si substrate layers) cut to form a substantially 45-degree inclined reflective surface 240 with respect to the horizontal bottom of the Si substrate 232. In this configuration, the upward propagating optical signal emanating from the prism reflector 225 is first focused by the lens 234 integrated into the Si substrate 232, and redirected to reflect off an internal side of the 45-degree inclined reflective surface 240 so that the reflected optical signal propagates horizontally into the input mode converter 244. To improve the reflective efficiency of the 45-degree inclined reflective surface 240, a reflective coating 242 (e.g., gold, aluminum, silver, or other type of high reflective (HR) coating) may be disposed over an external side of the 45-degree inclined reflective surface 240.

As previously discussed, the MFD (e.g., 3.7 μm) of the optical signal propagating from the laser source 210 to the input mode converter 244 (e.g., via the collimating lens 215, optical isolator 220, prims reflector 225, integrated lens 234, and the 45-degree reflective surface 240) is significantly greater than the MFD (e.g., <1 μm) of the optical signal propagating through the TFLN waveguide of the MZI modulator 246. If the 3.7 μm MFD optical signal were to be directly applied to the TFLN MZI modulator 246, there would be significant coupling losses due to the mismatch in the MFDs, given this type of TFLN MZI modulator design as discussed further herein. Thus, the input mode converter 244 is configured to gradually reduce the MFD of the optical signal from about 3.7 μm to about 1 μm so that the MFD of the optical signal is more suitable for optical transmission via the TFLN MZI modulator 246.

The optical signal transmitter 200 further includes a radio frequency (RF) signal transmission line 252, and a direct current (DC) bias electrical conductor 254, both of which are disposed over the SiO$_2$ layer 236 proximate the TFLN waveguide of the MZI modulator 246. As discussed in more detail further herein, an RF signal is provided to the transmission line 252. The TFLN waveguide of the MZI modulator 246 interacts with the electromagnetic field of the RF signal propagating via the transmission line 252 to cause the optical signal propagating via the TFLN waveguide of the MZI modulator 246 to be modulated with the RF signal. Also, as discussed in more detail further herein, a DC bias voltage is applied to the electrical conductor 254 to quadrature bias the TFLN waveguide of the MZI modulator 246.

The optical signal transmitter 200 further includes a modulator output photo detector (PD) 256. A sample of the RF modulated optical signal at the output of the TFLN MZI modulator 246 is provided to the modulator output PD 256. The modulator output PD detector 256 is configured to generate a modulator power electrical signal $P_M$ related to the emitted power of the RF modulated optical signal. For example, if the power signal $P_M$ is zero (0) or below an expected level, there may be an issue with the laser source 210 and/or any of the intermediate components between the laser source 210 and the output of the TFLN MZI modulator 246 (e.g., a misalignment of the optical path). An issue with the laser source 210 may be ruled out if the laser power electrical signal $P_L$ is at expected levels. On the other hand, if the modulator power signal $P_M$ is at expected power levels, then the optical signal transmitter 200 may be said to be operating normally.

The optical signal transmitter 200 may optionally include an output mode converter 248. As previously discussed, the MFD of the optical signal propagating within the TFLN MZI modulator 246 may be relatively small (e.g., <1 μm). Whereas the optical signal propagating via a single mode optical fiber 260 typically has a much greater MFD (e.g., 8-10 μm). Accordingly, the optional output mode converter 248 may be configured to gradually increase the MFD of the RF modulated optical signal from 1 μm at the output of the TFLN MZI modulator 246 to about 8-10 μm, which may be the typical MFD of an optical signal propagating via the optical fiber 260. It shall be understood that the input mode converter 244 is probably more critical than the output mode converter 248 as more losses generally occur if an optical signal with a large MFD is to propagate into an optical waveguide that accommodates a smaller MFD. The coupling losses would not be that high for the case where an optical signal with a small MFD is to propagate into an optical waveguide that accommodates a larger MFD.

With regard to the MFD mismatch discussed above, grating couplers and tapered mode transformers have been developed to suppress the coupling loss from an optical fiber to TFLN waveguide. Grating couplers directly etched on a TFLN waveguide was initially demonstrated with −10 dB/coupler coupling efficiency, and then improved to −1.43 dB/coupler by employing a chirped grating TFLN. However, due to fabrication complexity and polarization sensitivity, as well as strong wavelength dependency, grating couplers may not be favored for TFLN coupling.

Recently, an optical mode converter based on an inversed taper fabricated directly on TFLN was introduced to achieve low coupling loss between an optical fiber and a TFLN chip with wideband and polarization independent features. By fabricating the TFLN waveguide with an inverse taper-shaped region, the coupling loss was reported to be about 0.54 dB/coupler from an ultra-high numerical aperture (NA) optical fiber to a TFLN waveguide, and about 0.5 dB/coupler from a lensed optical fiber to a TFLN waveguide. However, a major challenge for practical application is the lack of efficient interface between the TFLN waveguide and the DFB laser chip. The extra fiber coupling used between a DFB laser chip and TFLN waveguide typically induces large chip-to-fiber loss on the large mode diameter side, as well as adding the size of the overall components.

Figure 3A:
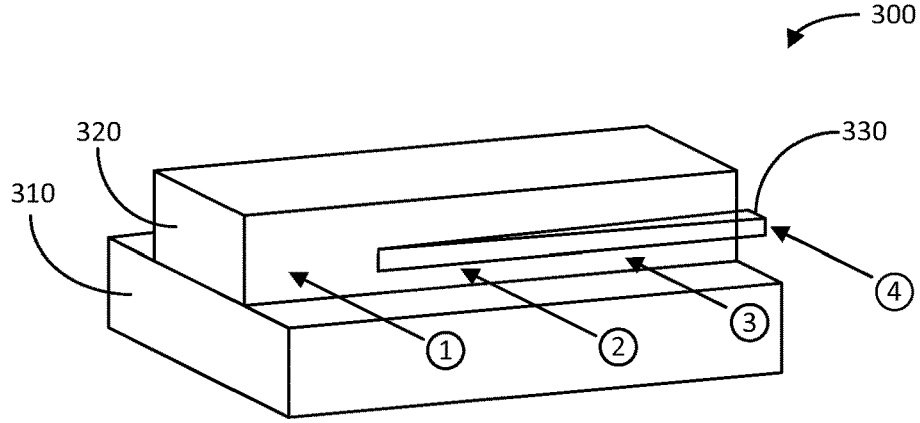
FIG. 3A illustrates a perspective view of an example optical mode converter in accordance with another aspect of the disclosure.

FIG. 3A illustrates a perspective view of an example optical mode converter 300 in accordance with another aspect of the disclosure. The optical mode converter 300 may be an example implementation of any of the optical mode converters 244 and 248 of optical signal transmitter 200 previously discussed.

In particular, the optical mode converter 300 includes a SiO$_2$ base layer 310, which may correspond to the SiO$_2$ layer 236 of optical signal transmitter 200. The optical mode converter 300 further includes an optical waveguide 320 (e.g., with a cross-sectional dimension of about 5 μm×5 μm), which may be comprised of SiON. The optical waveguide 320 may correspond to the SiON layer 238 or 250 of optical signal transmitter 200. The optical waveguide 320 includes an inverse tapered TFLN waveguide 330 embedded therein, which may be manufactured in accordance with silicon on insulator (SOI) techniques.

The narrower side of the inverse tapered TFLN waveguide 330 corresponds to the side where the optical signal has a larger MFD (conversely, the wider side of the inverse tapered TFLN waveguide 330 corresponds to the side where the optical signal has the smaller MFD). Accordingly, if the optical mode converter 300 corresponds to the input optical mode converter 244 of optical signal transmitter 200, then the left-side is the input of the optical mode converter 300. If, on the other hand, the optical mode converter 300 corresponds to the output mode converter 248, the left-side is the output of the optical mode converter 300. As an example, the wider side of the inverse tapered TFLN waveguide 330 may have a cross-sectional dimension of about 600 nm×400 nm.

Figure 3B:
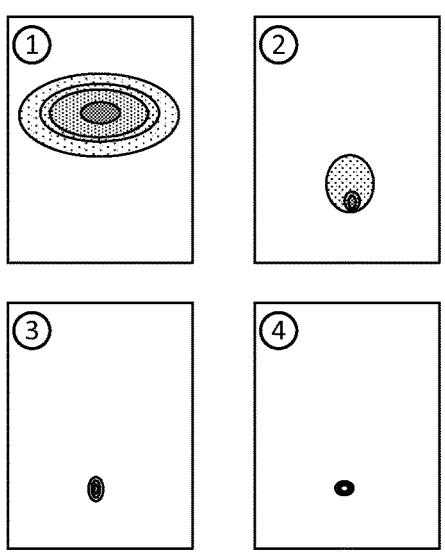
FIG. 3B illustrates example diagrams of example mode field diameters (MFDs) of an optical signal at various locations along the optical mode converter of FIG. 3A in accordance with another aspect of the disclosure.

FIG. 3B illustrates diagrams of example mode field diameters (MFDs) of an optical signal at various locations along the optical mode converter 300 in accordance with another aspect of the disclosure. The upper-left diagram, labeled with a circled "1", corresponds to the MFD (e.g., 3.7 µm) of the optical signal at a region within the optical waveguide 320 left of the narrow tip of the tapered TFLN waveguide 330. The upper-right diagram, labeled with a circled "2", corresponds to the MFD of the optical signal at a region within the tapered TFLN waveguide 330 closer to the narrower end thereof. The lower-left diagram, labeled with a circled "3", corresponds to the MFD of the optical signal at a region within the tapered TFLN waveguide 330 closer to the wider end thereof. The lower-right diagram, labeled with a circled "4", corresponds to the MFD (e.g., <1 µm) of the optical signal at a region right of the tapered TFLN waveguide 330. As the diagrams illustrate, the optical mode converter 300 effectuate the transformation of an optical signal from a relatively large MFD to a relatively small MFD or vice-versa (e.g., by about a factor four (4)).

Figure 3C:
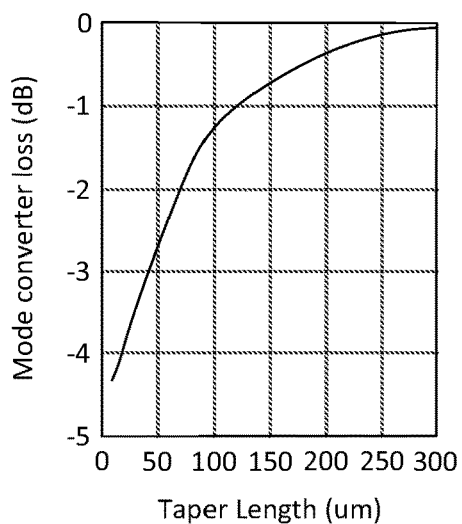
FIG. 3C illustrates a graph of an exemplary response of a mode converter loss versus length of an inverse tapered TFLN waveguide of the optical mode converter of FIG. 3A in accordance with another aspect of the disclosure.

FIG. 3C illustrates a graph of an exemplary optical mode converter loss versus length of the inverse tapered TFLN waveguide 330 of the optical mode converter 300 in accordance with another aspect of the disclosure. The x- or horizontal-axis of the graph represents the length of the inverse tapered TFLN waveguide 330 in micrometers (µm) ranging from zero (0) to 300 µm. The y- or vertical-axis represents the optical mode converter loss in decibels (dB) ranging from zero (0) to −5 dB. As the graph illustrates, the mode converter loss decreases as the length of the inverse tapered TFLN waveguide 330 is increased. At, for example, a length above 250 µm, the mode converter loss is essentially negligible (e.g., <0.1 dB).

Figure 4A:
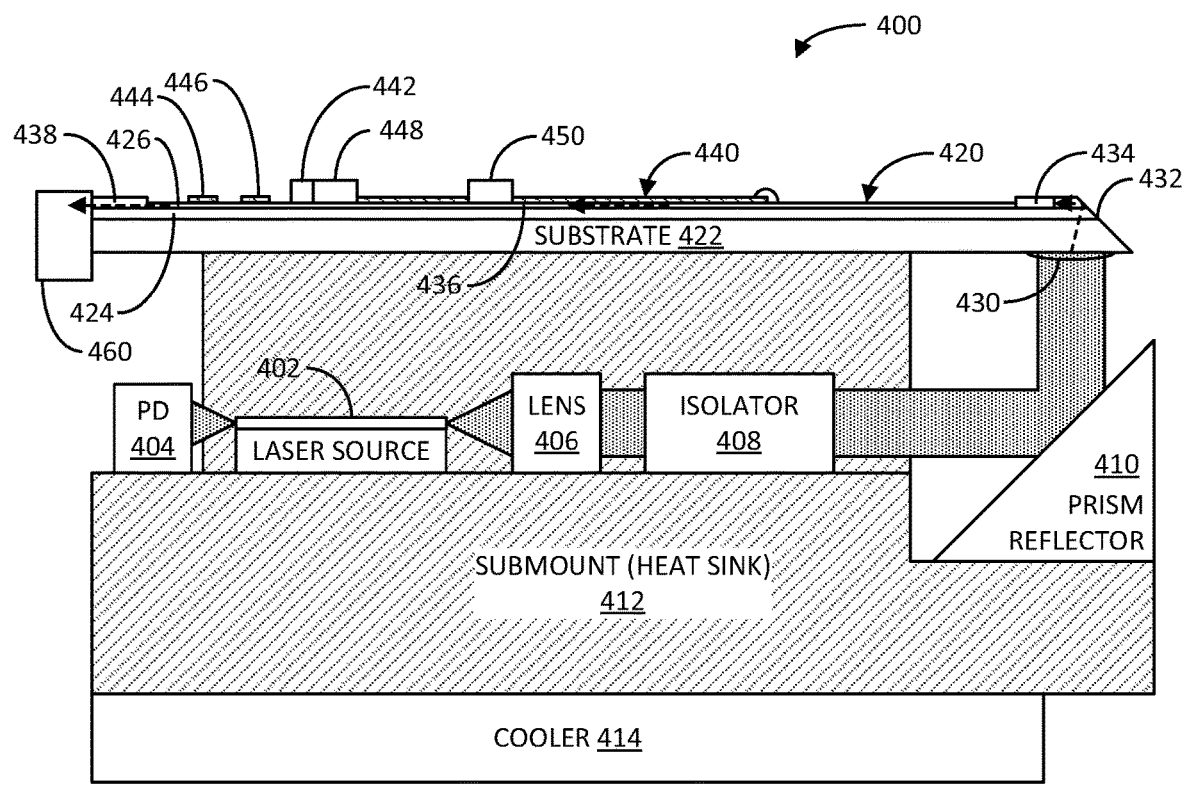
FIGS. 4A-4B illustrate side and top views of another exemplary optical signal transmitter in accordance with another aspect of the disclosure.
Figure 4B:
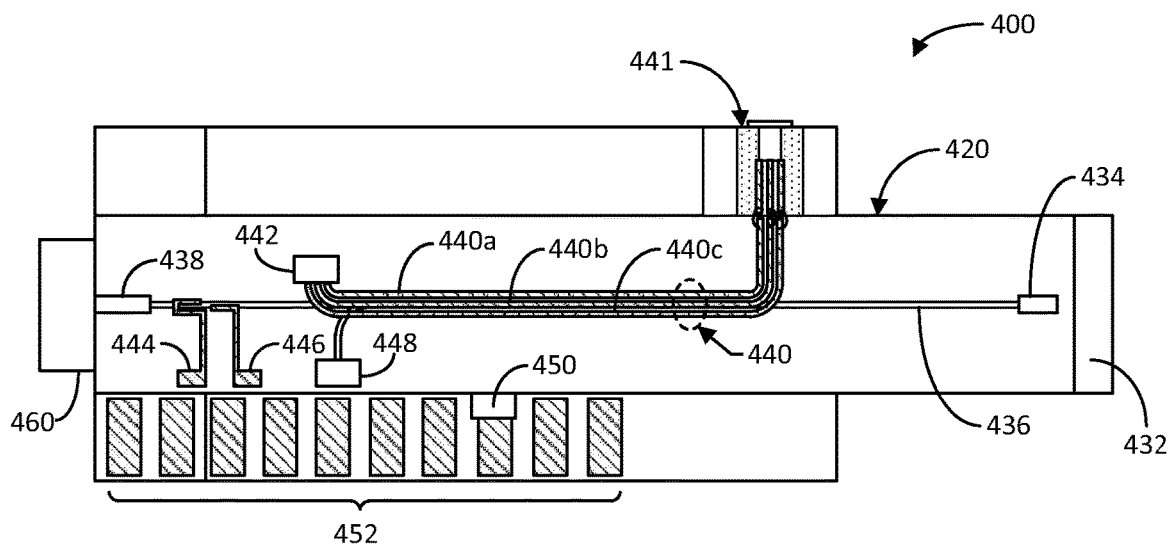

FIGS. 4A-4B illustrate side and top views of an exemplary optical signal transmitter 400 in accordance with another aspect of the disclosure. The optical signal transmitter 400 may be an example implementation of the optical signal transmitter 200 previously discussed.

The optical signal transmitter 400 includes a submount 412 (depicted with forward-slash crosshatch), which functions as the primary mount for all or most of the components of the optical signal transmitter 400, and as a heat sink to remove heat from the components of the optical signal transmitter 400. As an example, the submount 412 may be comprised of copper-tungsten (CuW), which has a relatively high thermal conductivity (e.g., 180-220 Watts per meter-kelvin (W/mK) at 25 degrees Celsius). To improve the heat removal function of the submount 412, the optical signal transmitter 400 may include a cooler (e.g., a Peltier cooler) mechanically/thermally coupled to the submount 412.

The optical signal transmitter 400 further includes a laser source 402 (e.g., a continuous wave (CW) distributed feedback (DFB) laser) mounted on the submount 412. The optical signal transmitter 400 further includes a laser monitoring photo detector (PD) 404, also mounted on the submount 412. Similar to optical signal transmitter 200, the laser monitoring PD 404 is configured to generate a laser power indicating electrical signal based on "reverse" propagating optical signal generated by the laser source 402. As in optical signal transmitter 200, the optical signal in optical signal transmitter 200 is indicated as a shaded region and also with dashed arrows.

The optical signal transmitter 406 further includes a collimating lens 406 and an optical isolator 408 mounted on the submount 412. For example, the collimating lens 406 and the optical isolator 408 may be cylindrical in-shape, and may be mounted within a complementary V-groove formed in the submount 412. As previously discussed, the collimating lens 406 is configured to collimate a "forward" propagating, dispersing optical signal generated by the laser source 402, and the optical isolator 408 is configured pass the collimated optical signal, while preventing reflected light from propagating in the reverse direction towards the collimating lens 406 and the laser source 402.

Additionally, the optical signal transmitter 400 includes a prism reflector 410 mounted on the submount 412 and configured to redirect the horizontally-rightward propagating optical signal from the optical isolator 408 upwards towards a microwave photonic integrated circuit (MWPIC) 420 (e.g., a 90-degree optical signal redirection). The horizontal position in both dimensions (right/left and into/out of the page) of the prism reflector 410 may be adjusted to align the optical signal with an integrated lens 430 of the MWPIC 420. The MWPIC 420 may also be mounted on the submount 412.

Similar to optical signal transmitter 200, the MWPIC 420 includes a substrate 422 (e.g., a silicon (Si) substrate), a silicon-oxide ($SiO_2$) layer 424 disposed over the substrate 422, and a thin-film lithium niobate (TFLN) MZI modulator 436 disposed over the $SiO_2$ layer 424. As mentioned, the bottom side of the substrate 422 may be etched to form the integrated lens 430. The right side of the MWPIC 420, including the substrate 422, $SiO_2$ layer 424, and an SiON layer of an input mode converter 434 may be cut to form a 45-degree inclined reflective surface 432. Although not shown in FIGS. 4A-4B, an exterior side of the 45-degree inclined reflective surface 432 may include a reflective coating (e.g., gold, aluminum, silver, or other type of high reflective (HR) coating) disposed thereon.

As mentioned, the optical signal transmitter 400 further includes the input optical mode converter 434 including an inverse tapered TFLN waveguide encapsulated by an SiON material. The input optical mode converter 434 is configured to convert a relatively large MFD (e.g., 3.7 µm) of an optical signal to a relatively small MFD (e.g., <1 µm), as previously discussed. The input optical mode converter 434 is optically coupled to the TFLN MZI modulator waveguide 436. Optionally, the optical signal transmitter 400 may include an output optical mode converter 438 configured to convert a relatively small MFD (e.g., <1 µm) of an optical signal to a relatively large MFD (e.g., 8-10 µm), as previously discussed. The output optical mode converter 438 is optically coupled to the TFLN MZI modulator waveguide 436. Additionally, the optical signal transmitter 400 includes an optical fiber connector 460 for connecting to an optical fiber for transmission of an RF modulated optical signal to a receiver, as previously discussed.

As seen better in FIG. 4B, the optical signal transmitter 400 includes an RF signal input coaxial connector 441 configured to receive an RF signal from, for example, a low noise amplifier (LNA). The optical signal transmitter 400 includes a coplanar transmission line 440 including an RF signal transmission line 440b interposed between grounded transmission lines 440a and 440c. The coplanar transmission line 440 is disposed over the SiO$_2$ layer 424. The coplanar transmission line 440 is coupled at one end to the RF signal input connector 441 and at an opposite end to a termination resistor 442, which may also be disposed over the SiO$_2$ layer 424. The coplanar transmission line 440 is positioned with respect to the TFLN MZI modulator waveguide 436 such that an electromagnetic field of the RF signal propagating via the coplanar transmission line 440 interacts with the TFLN MZI modulator waveguide 436 to effectuate a modulation of an optical signal propagating via the TFLN waveguide 436.

The optical signal transmitter 400 further includes a pair of electrical conductors 444 and 446, which may be disposed over the SiO$_2$ layer 424. The pair of electrical conductors 444 and 446 may be disposed over the diverging pair of the TFLN MZI modulator waveguide 436 for providing a quadrature DC bias voltage for the TFLN waveguide 436, as discussed in more detail with reference to optical signal transmission system 100. Further, the optical signal transmitter 400 includes a modulator monitoring photo detector 448 optically coupled to the TFLN MZI modulator waveguide 436 for generating a modulator power electrical signal related to the output power of the RF modulated optical signal, as previously discussed.

Also, the optical signal transmitter 400 includes a set of electrical conductors 452 for providing electrical signals into and out of the optical signal transmitter 400, including the quadrature DC bias voltage (into the transmitter 400), the laser power electrical signal (out of the transmitter 400), the modulator power electrical signal (out of the transmitter 400), an electrical signal, related to the temperature of the optical signal transmitter 400, generated by an optional temperature sensor 450 (e.g., thermistor) (out of the transmitter 400), electrical power for the laser source 402 (into the transmitter 400), and electrical power for the cooler 414 (into the transmitter 400).

In operation, the laser source 402 generates forward and reverse direction dispersing unmodulated CW optical signal. The laser monitoring PD 404 generates a laser power electrical signal $P_L$ based on the reverse direction CW optical signal from the laser source 402. The laser power electrical signal $P_L$ is provided to an external equipment via one or more of the electrical contacts 452. The collimating lens 406 collimates the forward direction CW optical signal and the optical isolator 408 passes the collimated CW optical signal while preventing reflected light from propagating in the reverse direction back into the collimating lens 406 and the laser source 402. The prism reflector 410 redirects the rightward horizontal propagating CW optical signal upwards towards the MWPIC 420.

The upward propagating CW optical signal is focused by the integrated lens 430 onto the 45-degree inclined reflective surface 432, which redirects the CW optical signal horizontally leftward into the input mode converter 434 (e.g., performs a 90-degree optical signal redirection), as indicated by the dashed arrow. The input mode converter 434 reduces the MFD of the CW optical signal from, for example, 3.7 μm to about 1 μm for transmission via the TFLN MZI modulator waveguide 436, also indicated by another dashed arrow.

Simultaneously, an RF signal is provided to the coplanar transmission line 440 via the coaxial connector 441. The proximity and position of the coplanar transmission line 440 with respect to the TFLN MZI modulator waveguide 436 causes the optical signal propagating via TFLN MZI modulator waveguide 436 to be modulated (e.g., amplitude/phase modulated) with the RF signal. A DC bias voltage, provided across the electrical conductors 444 and 446 via one or more electrical contacts 452, sets the quadrature bias of the TFLN MZI modulator waveguide 436.

The RF signal propagating via the coplanar transmission line 440 is provided to the termination resistor 442 to absorb the RF energy and prevent/reduce unwanted reflections back into the coplanar transmission line 440. A sample or portion of the RF modulated optical signal propagating via the TFLN MZI modulator waveguide 436 is provided to the modulator output PD detector 448, which generates a modulator power electrical signal $P_M$. The modulator power electrical signal $P_M$ is provided to an external equipment via one or more of the electrical contacts 452.

The RF modulated optical signal is optionally provided to the output mode converter 438 as indicated by yet another dashed arrow. The output mode converter 438 increases the MFD of the RF modulated optical signal from, for example, about 1 μm to 8-10 μm, which better matches the MFD for transmission via a single mode optical fiber. Such optical fiber may be secured by the optical fiber connector 460 in a manner that it is able to receive the RF modulated optical signal for transmission to a remote receiver.

The temperature sensor 450 may provide a temperature signal indicative of the temperature of the optical signal transmitter 400 to an external equipment via one or more of the electrical contacts 452. Also, via one or more electrical contacts 452, electrical power may be provided to the laser source 402 and the cooler 414.

Figure 5A:
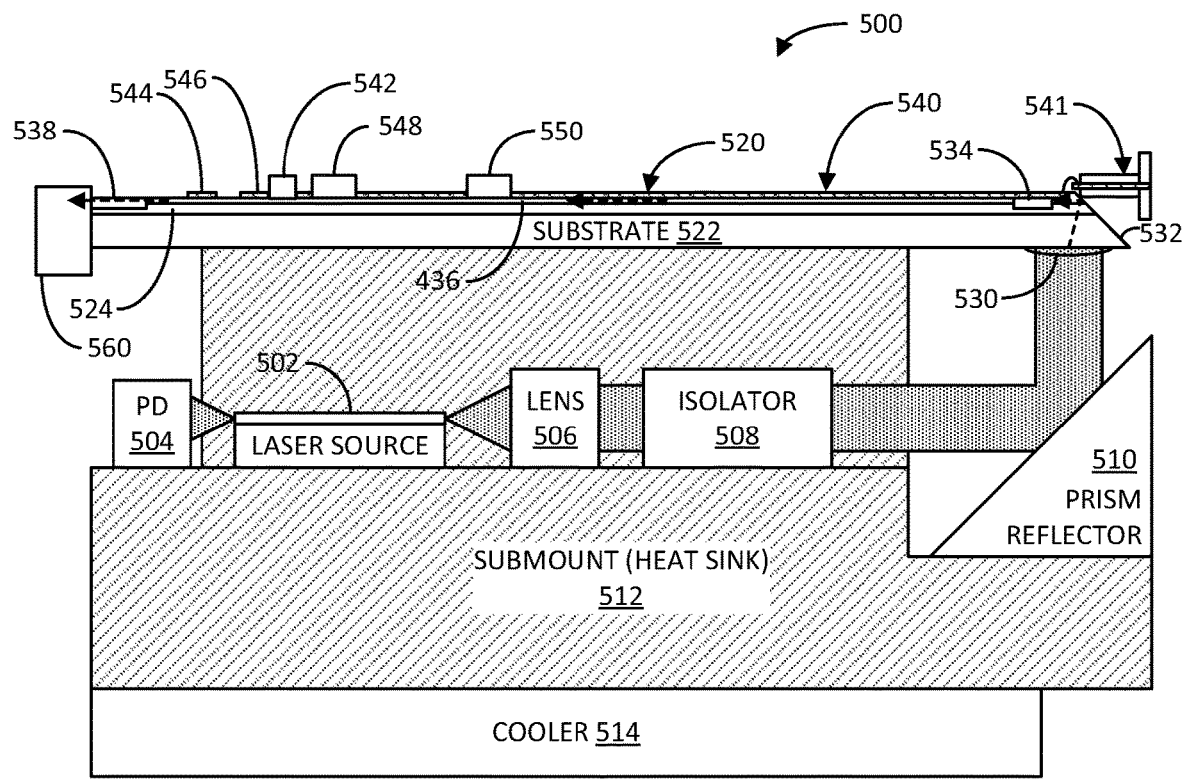
FIGS. 5A-5B illustrate side and top views of another exemplary optical signal transmitter in accordance with another aspect of the disclosure.
Figure 5B:
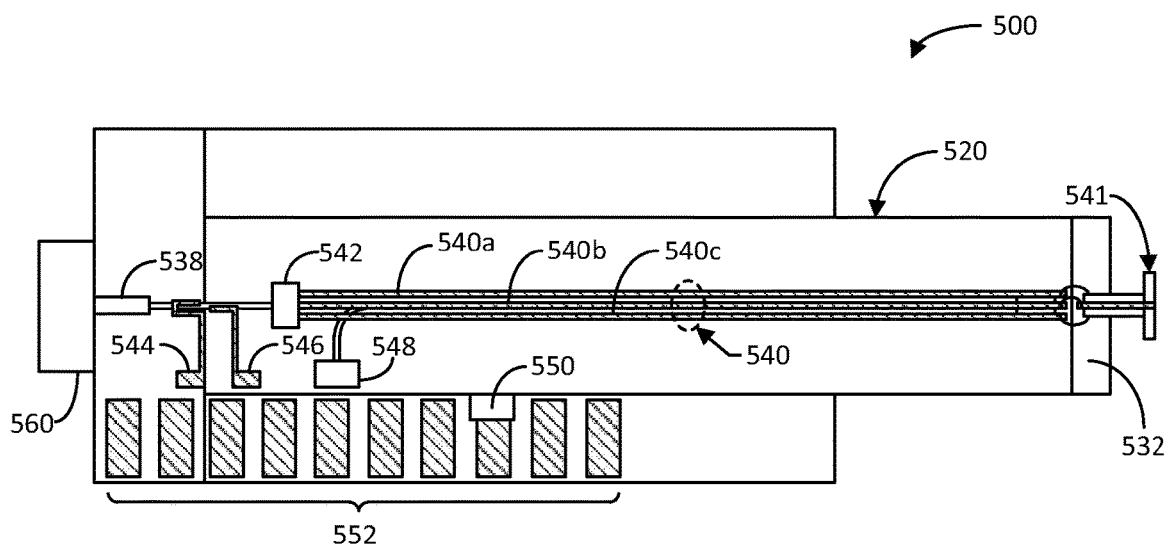

FIGS. 5A-5B illustrate side and top views of an exemplary optical signal transmitter 500 in accordance with another aspect of the disclosure. The optical signal transmitter 500 is a variation of optical signal transmitter 400 previously discussed in detail, and includes many of the same or similar elements identified with the same reference numbers with the exception that the most significant digit (MSD) is a "5" instead of a "4".

The optical signal transmitter 500 differs from the optical signal transmitter 400 in that the RF signal input coaxial connector 541 is positioned over the 45-degree inclined reflective surface 532, and the coplanar transmission line 540 including the RF signal transmission line 540b and the grounded transmission lines 540a and 540c extend in a substantially straight line from the input coaxial connector 541 to the termination resistor 542. This configuration eliminates the two 90-degree turns of the coaxial transmission line 440 of optical signal transmitter 400, which, generally, are sources of impedance mismatch and return loss degradation. Thus, from an RF signal perspective, the optical signal transmitter 500 may have advantages over the optical signal transmitter 400.

Figure 6:
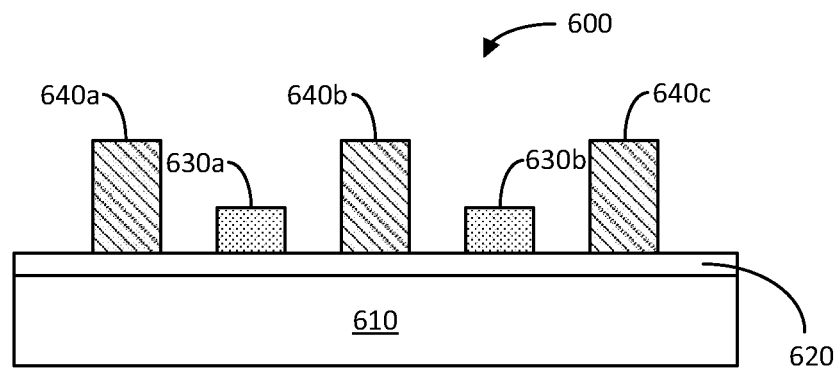
FIG. 6 illustrates a cross-sectional view of an example TFLN MZI modulator in accordance with another aspect of the disclosure.

FIG. 6 illustrates a cross-sectional view of an example TFLN MZI modulator 600 in accordance with another aspect of the disclosure. The TFLN MZI modulator 600 may be an example implementations of any of the TFLN MZI modulators previously discussed. The TFLN MZI modulator 600 includes a substrate 610 (e.g., a silicon (Si) substrate), an optional silicon-oxide (SiO$_2$) layer 620 disposed over the Si substrate 610, a pair of TFLN MZI modulator waveguides 630a and 630b disposed over/on the SiO$_2$ layer 620 (if present) or directly on the Si substrate 610, and a coplanar transmission line including an RF signal transmission line 640b and a pair of grounded transmission lines 640a and 640c disposed over/on the SiO$_2$ layer 620 (if present) or directly on the Si substrate 610.

The RF signal transmission line 640b is situated laterally between the pair of TFLN waveguides 630a and 630b. The TFLN waveguide 630a, in turn, is situated laterally between the RF signal transmission line 640b and the grounded transmission line 640a. Similarly, the TFLN waveguide 630b is situated laterally between the RF signal transmission line 640b and the grounded transmission line 640c.

The TFLN modulator 600 is an example of a ridge type modulator. That is, the pair of TFLN waveguides 630a and 630b are formed by first depositing a layer of TFLN, and then etching the TFLN layer to form the TFLN waveguides 630a and 630b Due to the ion slicing process used for thin film fabrication, the TFLN layer thickness may be less than 1 μm. Therefore, the height of the TFLN waveguide after etching may not exceed 1 μm. Thus, the MFD of the optical signal propagating via the TFLN waveguides 630a and 630b is in the vicinity of about or slightly less than 1 μm.

As previously discussed, the MFD of the CW optical signal propagating into the TFLN MZI modulator in optical signal transmitters 400 and 500 may be about 3.7 μm. To reduce the coupling loss into the TFLN MZI modulators, the input mode converters 434 and 534 is provided to reduce the MFD of the optical signal from 3.7 μm to about 1 μm. Although the input mode converters 434 and 534 reduce the coupling loss into the TFLN MZI modulators, there is still some coupling loss. Ideally, it would be better to couple the CW optical signal directly into the TFLN MZI modulator without the need for an optical mode converter. The following description provides another implementation of a TFLN modulator that may not require an input (nor output) mode converter.

Figure 7:
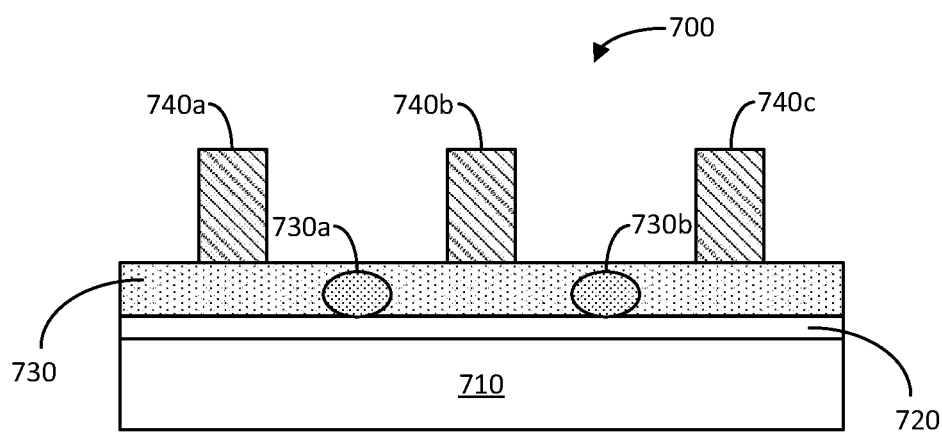
FIG. 7 illustrates a cross-sectional view of another example TFLN MZI modulator in accordance with another aspect of the disclosure.

FIG. 7 illustrates a cross-sectional view of an example TFLN MZI modulator 700 in accordance with another aspect of the disclosure. The TFLN MZI modulator 700 may be employed in any of the TFLN MZI modulators previously discussed. The TFLN MZI modulator 700 includes a substrate 710 (e.g., a silicon (Si) substrate), a bonding layer 720 (e.g., ultraviolet (UV) glue, benzocyclobutene (BCB) polymer, SU-8 polymer, bonding sheet, and others) disposed over and bonded to the Si substrate 710, a TFLN layer 730 including a pair of TFLN waveguides 730a and 730b formed therein, and disposed over and bonded to the bonding layer 720, and a coplanar transmission line including an RF signal transmission line 740b and a pair of grounded transmission lines 740a and 740c disposed over/on the TFLN layer 730.

The RF signal transmission line 740b is situated laterally between the pair of TFLN waveguides 730a and 730b (albeit, at a different (higher) layer). The TFLN waveguide 730a, in turn, is situated laterally between the RF signal transmission line 740b and the grounded transmission line 740a (albeit, at a different (lower) layer). Similarly, the TFLN waveguide 730b, in turn, is situated laterally between the RF signal transmission line 740b and the grounded transmission line 740c (albeit, at a different (lower) layer).

In TFLN MZI modulator 700, the pair of TFLN waveguides 730a and 730b are not formed by etching, but are formed by modifying the index of refraction at the regions of the TFLN layer 730 at which the TFLN waveguides 730a and 730b, respectively. The waveguides 730a and 730b are formed before thin film layer 730 is formed. The waveguides 730a and 730b are formed on the bulk LN wafer via Ti:In-diffusion or annealed proton exchange (APE) process. Then the wafer is bonded to the substrate 710. The backside of the LN is thinned down to ~7 um to form thin film structure 730. Then, those waveguide regions 730a and 730b are subjected to titanium ion implantation, which increases the index of refractions in those regions relatively to the remainder of the TFLN material layer 730. The higher index of refractions of the TFLN regions form the TFLN waveguides 730a and 730b, respectively.

As the TFLN waveguides 730a and 730b are formed without etching, the TFLN waveguides 730a and 730b may be made larger to, for example, accommodate an optical signal with a higher MFD. For example, the TFLN waveguides 730a and 730b may be made to accommodate an optical signal with an MFD of 7 μm. As the CW optical signal of optical signal transmitters 400 and 500 has an MFD of 3.7 μm, there is significantly less coupling loss into the TFLN MZI modulator 700; because, as previously discussed, there is significantly less coupling loss when an optical signal with a smaller MFD is coupled into a waveguide that accommodates a larger MFD compared to when an optical signal with a larger MFD is coupled into a waveguide that accommodates a smaller MFD.

Figure 8:
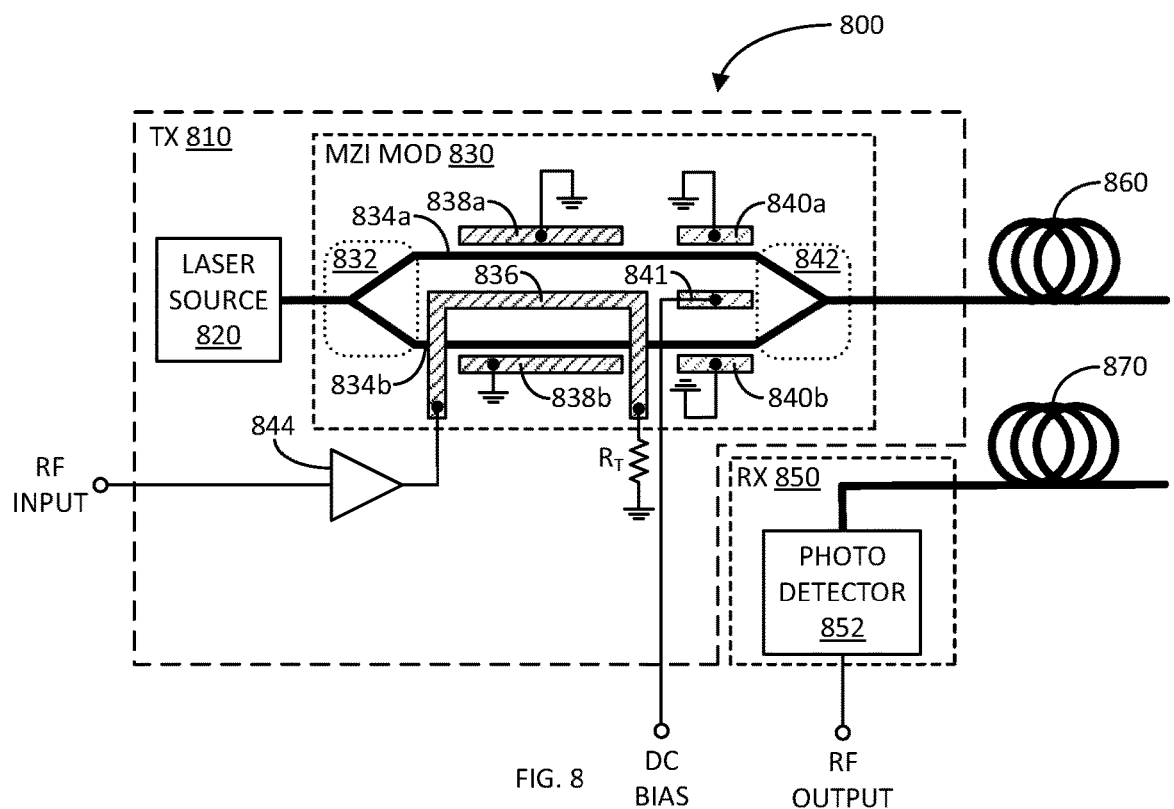
FIG. 8 illustrates a block diagram of an exemplary optical signal transceiver in accordance with another aspect of the disclosure.

FIG. 8 illustrates a block diagram of an exemplary optical signal transceiver 800 in accordance with another aspect of the disclosure. Although optical signal transmitters using TFLN MZI modulators have been discussed in detail, it shall be understood that such optical signal transmitters may be implemented as part of an optical signal transceiver. Accordingly, the optical signal transceiver 800 is an example of such a transceiver. In particular, the optical signal transceiver 800 includes an optical signal transmitter 810, an optical signal receiver 850, a transmission optical fiber 860, and a reception optical fiber 870.

The optical signal transmitter 810 may be implemented per any of the optical signal transmitters previously discussed. In particular, the optical signal transmitter 810 includes a laser source 820 (e.g., a continuous wave (CW) distributed feedback (DFB) laser source), a Mach-Zehnder interferometer (MZI) modulator 830 including a Y-optical splitter 832, a first waveguide 834a, a second waveguide 834b, and a Y-optical combiner 842. The optical waveguides 832, 834a-b, and 842 may be implemented with thin-film lithium niobate (TFLN).

The MZI modulator 830 further includes a coplanar transmission line including a radio frequency (RF) signal transmission line 836 and grounded transmission lines 838a-b. The RF signal transmission line 836 includes a first end coupled to an output of a low noise amplifier (LNA) 844. The LNA 844 includes an input configured to receive an input RF signal. The RF signal transmission line 836 includes a second end coupled to a termination resistor $R_T$. Additionally, the MZI modulator 830 includes a pair of grounded electrical conductors 840a and 840b and a DB biased electrical conductor 841, where electrical conductors 840a and 840b may be coupled to ground, and electric conductor 841 may be configured to receive a DC bias voltage. The Y-optical combiner 842 includes an output coupled to the transmission optical fiber 860.

Based on the positions of the coplanar transmission lines 836 and 838a-b with respect to the TFLN waveguides 834a-b, the CW optical signal generated by the laser source 820 is modulated by the input RF signal amplified by the LNA 844 and transmitted to the termination resistor $R_T$ via the coplanar transmission lines 836 and 838a-b. The TFLN waveguides 834a-b and the coplanar transmission lines 836 and 838a-b may have any of the configurations of TFLN MZI modulators 600 and 700 previously discussed. The DC bias voltage applied to electric conductor 841, which is situated laterally between the TFLN waveguides 834a-b, provide the desired quadrature bias to the TFLN waveguides 834a-b. The RF modulated optical signal is then provided to the transmission optical fiber 860 for transmission to a remote receiver or transceiver.

The optical signal transceiver 850 may include a photo detector (PD) 852 including an input coupled to the reception optical fiber 870. The photo detector (PD) 852 includes an output configured to generate an RF signal based on an RF modulated optical signal received from a remote transmitter or transceiver via the reception optical fiber 870.

Figure 9:
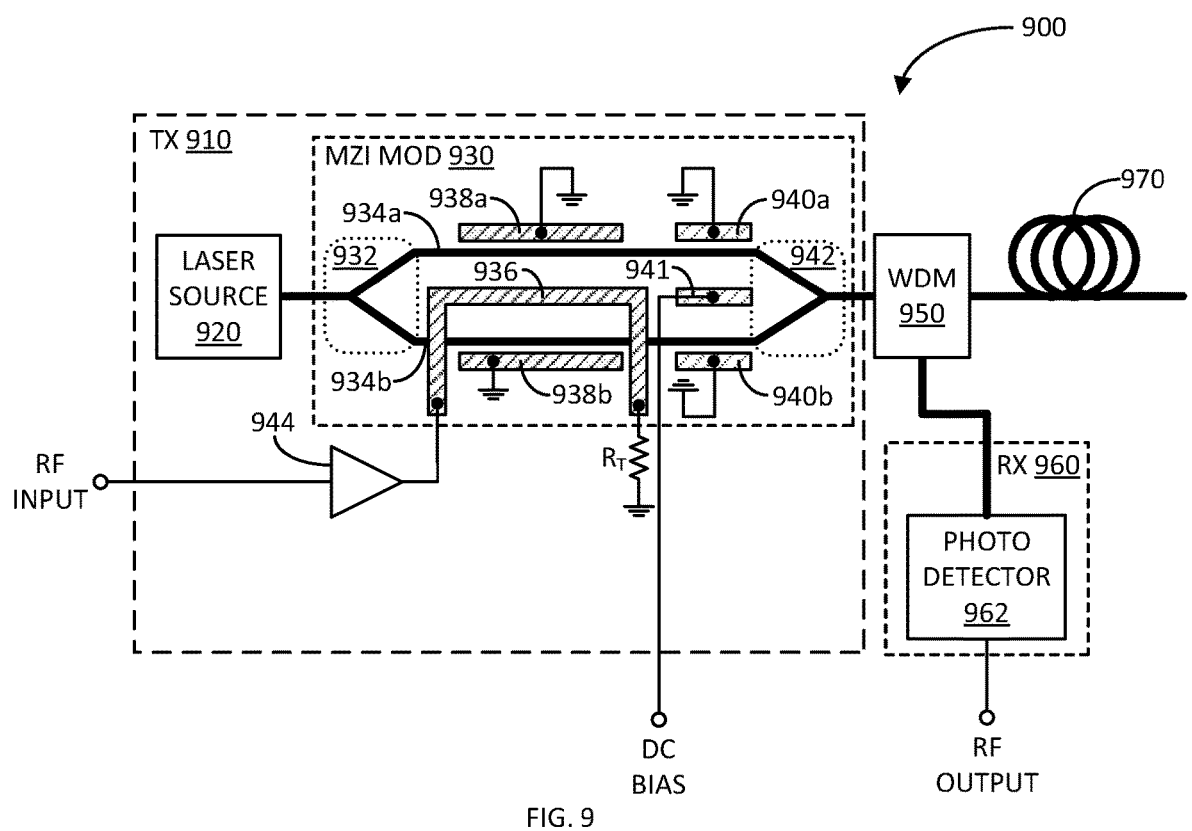
FIG. 9 illustrates a block diagram of another exemplary optical signal transceiver in accordance with another aspect of the disclosure.

FIG. 9 illustrates a block diagram of another exemplary optical signal transceiver 900 in accordance with another aspect of the disclosure. The optical signal transceiver 900 is a variation of optical signal transceiver 800, and includes many of the same or similar elements as indicated by the same reference numbers with the exception that the most significant digit (MSD) is a "9" in the case of optical signal transceiver 900.

The optical signal transceiver 900 differs from optical signal transceiver 800 in that a single optical fiber 970 serves both to transmit an RF modulated optical signal from the optical signal transceiver 900 to a remote transceiver, and receive an RF modulated optical signal from the remote transceiver. The optical signal transceiver 900 further includes a wavelength division multiplexer (WDM) 950 including an input port coupled to the output of the MZI modulator 930 of the optical signal transmitter 910, an output port coupled to an input of the photo detector 962 of the optical signal receiver 962, and an input/output (I/O) port coupled to the optical fiber 970.

In this example, the transmit RF modulated optical signal has a wavelength $\lambda_T$ different than the wavelength $\lambda_R$ of the received RF modulated optical signal. Accordingly, the WDM 950 may couple the transmit RF modulated optical signal to the optical fiber 970, while couple the received RF modulated optical signal to the photo detector 962 due to difference in the transmit and received wavelengths $\lambda_T$ and $\lambda_R$.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
    a Mach-Zehnder interferometer (MZI) modulator, comprising:
        a Y-optical splitter;
        a first thin-film lithium niobate (TFLN) waveguide formed within a TFLN material layer, wherein the first TFLN waveguide has a first index of refraction greater than a second index of refraction of the TFLN material layer, and wherein the first TFLN waveguide is coupled to a first output of the Y-optical splitter;
        a second TFLN waveguide formed within the TFLN material layer, wherein the second TFLN waveguide has the first index of refraction, and wherein the second TFLN waveguide is coupled to a second output of the Y-optical splitter;
        a Y-optical combiner including a first input coupled to the first TFLN waveguide and a second input coupled to the second TFLN waveguide; and
        first and second electrical conductors situated proximate the first and second TFLN waveguides, wherein the first and second electrical conductors are configured to receive a direct current (DC) bias voltage across the first and second electrical conductors;
    a laser source coupled to an input of the Y-optical splitter of the MZI modulator;
    a submount over which the MZI modulator is mounted;
    a collimating lens optically coupled to the laser source, wherein the collimating lens is positioned in a groove formed in the submount for optically aligning with the laser source; and
    an optical isolator optically coupled to the collimating lens, wherein the optical isolator is also positioned within the groove of the submount for optically aligning with the collimating lens and the laser source.

2. The apparatus of claim 1, wherein the MZI modulator further comprises a coplanar transmission line including a radio frequency (RF) signal transmission line situated laterally between the first and second TFLN waveguides, and first and second grounded transmission lines, wherein the first TFLN waveguide is situated laterally between the RF signal transmission line and the first grounded transmission line, and wherein the second TFLN waveguide is situated laterally between the RF signal transmission line and the second grounded transmission line.

3. The apparatus of claim 2, wherein the coplanar transmission line is disposed over the TFLN material layer.

4. The apparatus of claim 2, further comprising a low noise amplifier (LNA) including an input configured to receive an RF signal, and an output coupled to the coplanar transmission line to increase overall link gain and lower link noise figure (NF).

5. The apparatus of claim 2, further comprising a termination resistor coupled to the coplanar transmission line to reduce or prevent RF signal reflections.

6. The apparatus of claim 1, wherein the MZI modulator further comprises a substrate, wherein the TFLN material layer is disposed over the substrate.

7. The apparatus of claim 6, wherein the substrate comprises silicon.

8. The apparatus of claim 6, wherein the MZI modulator comprises a bonding layer situated between the TFLN material layer and the substrate.

9. The apparatus of claim 8, wherein the bonding layer comprises an ultraviolet (UV) glue, a benzocyclobutene (BCB) polymer, an SU-8 polymer, or a bonding sheet.

10. The apparatus of claim 1, wherein the laser source comprises a continuous wave (CW) distributed feedback (DFB) laser source, and further comprising a monitor photo detector (PD) optically coupled to the laser source to monitor output signal generated by the laser source.

11. The apparatus of claim 1, further comprising a prism reflector configured to change a direction of an optical signal received from the optical isolator by substantially 90 degrees enabling product compactness.

12. The apparatus of claim 11, wherein the MZI modulator is formed in a microwave photonic integrated circuit (MWPIC) including a lens integrated or etched on a bottom side of a substrate of the MWPIC, the lens being configured to receive the optical signal from the prism reflector.

13. The apparatus of claim 12, wherein the MWPIC includes a 45-degree inclined reflective surface configured to redirect the optical signal from the integrated lens towards the MZI modulator, wherein the prism reflector and 45-degree inclined reflective surface are collectively configured to generate a foldback optical propagation of the optical signal, and wherein the MWPIC further comprises a mode-transforming taper integrated into the TFLN layer, the mode-transforming taper being configured to match the mode diameter of the reflected optical signal to the input region of the TFLN waveguide, thereby reducing coupling losses and improving optical efficiency.

14. An apparatus, comprising:
  a Mach-Zehnder interferometer (MZI) modulator, comprising:
    a Y-optical splitter;
    a first thin-film lithium niobate (TFLN) waveguide formed within a TFLN material layer, wherein the first TFLN waveguide has a first index of refraction greater than a second index of refraction of the TFLN material layer, and wherein the first TFLN waveguide is coupled to a first output of the Y-optical splitter;
    a second TFLN waveguide formed within the TFLN material layer, wherein the second TFLN waveguide has the first index of refraction, and wherein the second TFLN waveguide is coupled to a second output of the Y-optical splitter;
    a Y-optical combiner including a first input coupled to the first TFLN waveguide and a second input coupled to the second TFLN waveguide;
  a laser source coupled to an input of the Y-optical splitter of the MZI modulator;
  a collimating lens optically coupled to the laser source;
  an optical isolator optically coupled to the collimating lens
  a prism reflector configured to change a direction of an optical signal received from the optical isolator by substantially 90 degrees;
  a microwave photonic integrated circuit (MWPIC) comprising:
    a substrate comprising an integrated lens configured to receive the optical signal from the prism reflector; and
    a 45-degree inclined reflective surface configured to redirect the optical signal from the integrated lens towards the MZI modulator, wherein the prism reflector and 45-degree inclined reflective surface are collectively configured to generate a foldback optical propagation of the optical signal.

15. The apparatus of claim 14, wherein the laser source comprises a continuous wave (CW) distributed feedback (DFB) laser source.

16. The apparatus of claim 14, wherein the MZI modulator further comprises first and second electrical conductors situated proximate the first and second TFLN waveguides, wherein the first and second electrical conductors are configured to receive a direct current (DC) bias voltage across the first and second electrical conductors.

17. The apparatus of claim 14, further comprising a termination resistor coupled to the coplanar transmission line.

* * * * *